3,044,235
DUST COLLECTION
Frank L. Schneider, Round Hill Lane,
Port Washington, N.Y.
No Drawing. Filed Nov. 27, 1959, Ser. No. 855,538
3 Claims. (Cl. 55—84)

This application is concerned with a new and useful method for removing solid particles from vapors containing them, including ordinary air. More particularly, it is concerned with a method whereby solid particles are removed from vapors containing them by a process comprising a co-condensation of unique liquids with steam, the condensation taking place on the surface of the solid particles so as to increase their diameter and render them more readily removable by standard means known to the art.

This application is a continuation-in-part of earlier filed patent application, Serial Number 703,993, filed December 20, 1957, now abandoned.

The removal of minute solid particles from vapors, the particles having a weight which is too low to permit their settling out by the force of gravity, is a problem which has long occupied the attention of the art. No completely satisfactory answer has yet been found. Sometimes these particles are valuable and it is desirable to remove them for re-use as in the case of catalysts in an oil refinery. At other times the particles are toxic or at least undesirable as in the case of pollens or of the exhaust from internal combustion engines, particularly those which must be operated in an enclosed atmosphere as in a mine. Another example of undesirable particles is those from coal furnaces which each year vent thousands of tons of polluting particles into the air.

It has long been known to introduce steam into the particle-containing vapor, hereinafter called the gas stream, and to subsequently condense the steam. The steam condenses on the solid particles just as rain forms on the dust in the atmosphere, thus increasing their diameter and total weight and making it easier to collect them by conventional means.

Three difficulties have arisen in the use of this condensation procedure. The first is the efficiency of the cooling. Cooling has been accomplished by (1) mixing the gas stream with colder air or other non-condensible gas, (2) by bringing the gas stream in contact with cold surfaces cooled in turn by water or other cooling liquid, and (3) by adiabatic expansion of the gas. The high heat of vaporization of water and the low specific heat of air result in the need for a very large quantity of air to bring about the condensation. The consequent large volume of air or gas must be moved through the remainder of the equipment. Contact with a water-cooled surface has the obvious disadvantage that much, if not most, of the condensation will take place on that surface rather than on the gas stream-borne particles where it is desired.

The second difficulty involves the ability of the condensed vapor to wet the surface of the solid particles. If the solid is not wetted or covered by an unbroken and uniform layer of condensate, it will not act properly as a condensing nucleus. The non-wetting occurs, e.g., when the solid is an oily soot. It has been found also that the larger particles are preferentially wetted by the condensing liquid with the result that the smaller particles are not entrapped and escape collection.

The third difficulty lay in the cost of cooling. The methods described above are not only low in efficiency but high in cost. Adiabatic cooling is most effective but highest in power consumption. It requires a pressure drop after addition of the condensible vapor. This drop is obtained by compressing the original solid-laden gas, then cooling back to the original saturation temperature and finally allowing it to expand to atmospheric pressure. Thus a double cooling is actually required.

The present invention provides new and effective means and methods for overcoming these difficulties.

In its broadest aspects, this invention comprises removing non-settling particles, that is particles whose weight is so low that they do not settle under the influence of gravity, from a gas stream containing them by mixing the particle-laden gas stream with steam and the vapors of a water-miscible compound having a boiling point at atmospheric pressure which is higher than the boiling point of water, and preferably, having a boiling point of from about 150° C. to about 250° C.

Compounds boiling below this temperature may also be employed but are not preferred since they require the removal of excessive amounts of heat for condensation. Similarly, liquids boiling above this range may also be employed, but are not preferred since they require the expenditure of too much expensive energy to volatilize them.

Suitable compounds for the practice of this invention which as noted above and explained more fully hereinafter, are utilized in the vapor state and include organic liquids which are at least partially miscible with water, that is, at least to the extent of 10% by weight and which have a boiling point within the desired range. There may be mentioned by way of example, polyhydroxylic liquid alcohols such as ethylene glycol, glycerol, propylene glycol, 1,2-dihydroxy butane, 1,3-dihydroxy butane or 1,4-dihydroxybutane or 2,2-diethyl-1,3-propanediol. Others include hydroxy ethers of the class known as "Cellosolves" including 2-ethoxy ethanol-1, glycol monomethyl ether, glycol monoethyl ether, amines such as hexyl amine, heptyl amine, triethanol amine, and acids such as acetic, propionic and butyric. It is usually best not to use acids or bases such as the amines since they may have a corrosive action on the equipment or react with the particles or the coating on the particles resulting in the loss of some reagent. The preferred compounds are ethylene glycol and glycerol. They are preferred because they are chemically inert and are readily available at an economic price. They are also completely water miscible and this is desirable for maximum efficiency.

The addition of the vapor of the second higher boiling liquid to the stream has been found to increase the efficiency of the older method by making it possible to condense larger amounts of the steam with less cooling than is ordinarily required. Further, since the evaporation of the liquid containing water and the co-condensate requires more heat than would be required for the water alone, a minimum amount of re-evaporation of the liquid from the solid, that is, the particle nucleus, will occur. Moreover, it has unexpectedly been discovered that the addition of the second vapor markedly increases the total number of particles removed from the gas stream and this number includes the smaller particles, for example, those having diameters as low as 0.1 micron or even lower, which have heretofore escaped entrapment in the steam.

In carrying out the invention, the gas stream to be purified is admixed with the steam and second selected vapor by any of the conventional means. The admixture may take place, for example, by conducting the gas stream past a Venturi throat and the passage of the stream draws the mixture of steam and its co-condensible vapor into the main stream. Alternatively, the steam and second vapor may be injected into the main stream by a pressure injector such as is used in injecting fuel into the cylinder of a diesel engine. Other means of mixing will be readily apparent to those skilled in the art. The mixture of particle-laden gas stream, steam and second vapor is then cooled and condensed by any of the three means mentioned above, that is, by (1) mixing with a colder non-condensible gas, (2) bringing it into contact with a cold surface, or (3) by adiabatic expansion.

The condensate may then be collected by any of the usual means, for example, by passing through a porous barrier. Herein lies a further advantage of this invention. Since the particles when they meet the porous barrier are already encased in a droplet of condensed liquid they do not collect on the barrier to the same extent that they would if they were dry. Rather, in great measure, they wash off the surface of the barrier with the condensate thus decreasing the necessity of frequent cleaning or replacement of the barrier.

A second conventional method applicable to the collection of the co-condensate droplets of this invention which contain the solid particle nucleus, is the so-called inertial method and depends upon the greater inertia of the moving droplets over that of the gas molecules. When the path of the moving droplets and gas molecules is suddenly changed in direction this greater inertia prevents the droplets from changing their direction and they collect on a surface which is placed in their path.

A third conventional method which is most effective is the electrostatic precipitation method. By passing the droplets first between plates charged electrostatically either negatively or positively, the droplets take on the same charge. They are then conducted between plates having the opposite charge and precipitate on the plate under the influence of electrostatic forces.

One of the most difficult problems encountered in removing solid particles from gas streams is the removal of particles covered with a fine layer of oily material as, for example, the sooty particles emanating from a coal furnace. This is because the encased particles resist wetting by the condensing steam and thus are not entrapped in the condensed droplet. Even with the use of the second condensible vapor of this invention it is difficult to effect removal of these particles.

The process of this invention in one of its aspects provides for the removal of oily or other non-wettable particles by mixing the vapor of a third compound with the gas stream-second condensible vapor composition described above. This third vapor is the vapor of a wetting agent which at atmospheric pressure is volatile at the temperature range employed, that is, from about 95° C. to about 250° C. By the term "volatile" is meant that the compound has a low enough boiling point to vaporize with the water or that it will steam distill with the water so as to produce sufficient vapor to wet the particles. The wetting agent may be anionic, cationic, or non-ionic. It is preferred to use a non-ionic agent since there is less danger of corrosion of the equipment when this type of wetting agent is used.

There are a number of wetting agents which can be advantageously employed in the practice of this aspect of the invention. They include, for example, condensation products of various polyethylene glycols and alkylene oxides which may be further condensed with fatty acids. It has been found that Antarox B–100 (polyethylene glycol oleate) and Antarox B–290 (97% castor oil polyethylene glycol condensate and 3% water) are especially useful in carrying out this invention. These products are available from Antara Products, a division of General Aniline and Film Corporation, 444 Madison Avenue, New York, N.Y. However, as pointed out above, other wetting or surface active agents can be successfully utilized. The vapors of the surface active agent may be mixed with the other vapors and with the gas stream in any convenient manner. For example, the venturi throat or pressure injector discussed above may be used.

The amount of steam, co-condensing vapor and, if desired, wetting agent which will be used in a particular application will depend, of course, upon the number and type of particles to be removed. The number of these may be readily measured and is referred to as the solids burden of the gas. It may be expressed in grains per cubic foot. The optimum amounts of each component of this invention can be readily determined with a minimum of experimentation. One merely determines the solids burden of the gas stream, applies the process of the invention with varying amounts of each reagent and then determines the solids burden of the resulting gas stream.

It has been found that in most applications optimum results are obtained if the weight of steam used is from about 10 to about 1000 times the solids burden of the gas stream. With highly porous, low density particles such as carbon, fly ash, and slags or with particles of extremely small diameter, for example, 0.05 to 1 micron, relatively large amounts of steam within this range will be used. With larger particles, i.e. from 5 to 20 microns, and/or denser, non-porous particles, smaller amounts will be employed. The weight of co-condensing vapor, no matter what the particle size and porosity, is from about 0.1 to about 2 times the solids burden of the gas stream and the vapor of the surface active agent, if used, is employed in from about 0.01 to 0.3 times the solids burden of the gas. In preferred operations the steam is used at from about 100 to 500 times the weight of the solids burden, the co-condensing vapor is used at from about 0.3 to about 0.7 times the weight of the solids burden and the surface active agent at from about 0.05 to about 0.1 times the weight of the solids burden.

Efficiency decreases if less than the optimum amounts of reagents are used, although the process is still operative, and may be used, for example, where local ordinances are not too strict with respect to the amount of solids which can be released to the atmosphere. There is no objection to using more than the optimum amounts since in most cases they will be collected and re-used anyway. However, the long range cost of operation is increased because of the usual unavoidable losses in operations involving condensing and re-evaporation of liquids.

The vapors used in the operation of this process may be generated by any of the usual known methods for producing vapors. In many larger establishments the steam will be available as exhaust from other uses, for example, as exhaust from a steam turbine. In these instances the other vapors will be generated by separate heating. In other cases it may be necessary to separately generate the steam and in these instances preferred operations will include volatilization of the vapors from liquid mixtures since, as is well known, lower temperatures are required to volatilize mixtures than to volatilize pure liquids.

Condensation of the mixed vapors of this invention, as has been pointed out above, may be effected by either of the three usual means. Of these, adiabatic expansion is the most effective. In adiabatic expansion, the mixed vapors and, of course, the gas stream itself, are cooled by expansion, the latter being effected by means of a pressure drop. In condensing the compositions of this invention, a pressure drop of from 0.5 to about 5 lbs. per square inch is effective, although this will depend on the temperature of the mixture. Of course, so as to minimize expenditure of energy, it is desirable that the process be carried out as close as possible to the temperature at which condensation will be effected. Usually this will be from about 95° C. to about 110° C., and preferably from about 95° C. to about 102° C.

The adiabatic pressure drop or expansion may be effected by directing the path of the gas stream-vapor composition through a nozzle. This has the result of increasing the pressure up stream from the nozzle and decreasing it downstream from the nozzle. When the composition reaches the area of decreased pressure it expands adiabatically, the temperature drops and the condensible vapors condense.

In preferred operations the adiabatic expansion is effected by conducting the mixed gas stream-vapor composition through a porous barrier. This has the advantage of producing a pressure drop and also of removing the larger particles. The porosity of the barrier should be such that only the larger particles are removed. These can be readily washed off by simply flushing with water. In fact, it is possible to continuously flush the barrier by washing water through and over it.

If the pores in the barrier are too small it will remove the smaller particles and become more difficult to maintain, since a simple flushing operation will not be sufficient to remove them. Also, a barrier of low diameter pores may effect too great a pressure drop so that condensation will actually take place within the barrier resulting again in deposition of small particles within the pores. Furthermore, such barriers are expensive to obtain.

Typical barriers which may be used in the practice of this invention include knitted wire mesh pads, perforated metal sheets and ceramic plates. Other possible barriers will be known to those skilled in the art.

It will be apparent that if the porous barrier method is employed to effect the diabatic expansion the resistance to gas flow offered by the barrier must be such as to produce a sufficient pressure drop on the down stream side to bring about condensation. Also, as pointed out above, the pressure drop should not be so great as to bring about appreciable amounts of condensation within the barrier itself. The desired difference in pressure between the upstream side of the barrier and the downstream side should be from about 0.5 to about 5 lbs. per square inch. The ideal barrier for each application can readily be determined with a minimum of experimentation, for example, by simply trying out a variety of barriers.

The following examples are given by way of illustration only and are not to be construed as limitations of this invention, many variations of which are possible without departing from the spirit or scope thereof.

*Example I*

A portion of the atmosphere of a room having a pollen content of 80 was admixed in a continuous manner at 98° C. with steam in the amount of 10 times the weight of the pollen and glycerine vapors in the amount of 0.5 times the weight of the pollen by conducting the whole through a pump system where it was cooled by external cooling. The mixture condensed and was collected by inertial methods. The air emanating from the system had a pollen count of only 4.

The above experiment was repeated at 100° C. using steam in the amount of 100 times the weight of pollen and hexyl amine vapors in the amount of 1.5 times the weight of the pollen. The pollen count was reduced to 3.2.

*Example II*

The solids burden of the atmosphere in the grinding room of a cement plant was reduced by 98% by conducting the atmosphere in a continuous manner at 102° C. into a pump system where it was mixed with 1000 times its solids content weight of steam and 2 times its solids content of ethylene glycol and then conducted through a wire mesh barrier which produced a pressure drop of about 0.5 lb. per sq. in. The steam and ethylene glycol vapors condensed on the solid particles and were collected.

The above experiment was repeated at 110° C. using 150 times the weight of steam, an equal weight of propylene glycol and a porous ceramic barrier which produced a pressure drop of about 2 lbs. per sq. in. The solids content of the atmosphere was reduced by 90%.

*Example III*

The atmosphere from the catalyst regenerators of an oil refinery was found to contain a high solids burden of fine catalyst which it was desirable to recover. More than 95% of this catalyst was recovered by passing the atmosphere in a continuous manner through a pump system where it was mixed at 102° C. with 100 times its solids content weight of steam, 2 times its solids content weight of polyethylene glycol oleate and two times its solid content of glycerine. It was conducted through a nozzle effecting a pressure drop of 1 lb. per sq. in. The vapor content of the mixture condensed and was collected by passage through an inertial collector. The liquids were evaporated and the catalyst recovered.

The above experiment was repeated using the same amounts of steam and glycerine but with 0.2 times the solids content weight of 97% castor oil polyethylene glycol condensate with 3% water. A total of 92% of the catalyst was recovered.

*Example IV*

The solids content from the effluent of the smoke stack of a coal furnace was reduced 93% by conducting it in a continuous manner through a pump system past a venturi throat at such a rate that 0.75 lb. per hour of solids entered the system. The particle-laden effluent was conducted past a venturi throat where a mixture of steam, propionic acid vapors and polyethylene glycol oleate was admitted. The resulting mixture was such that it contained 150 times the solids content weight of steam, 2 times the solids content weight of propionic acid and 0.7 times the solids content weight of polyethylene glycol oleate. The mixture, which was at 101° C., was conducted through a wire mesh barrier which effected a pressure drop of 0.75 lb. per sq. in. The vapors condensed and were collected by the inertial method. The condensate, after removal of the solids, was returned to the vapor generator for re-use.

What is claimed is:

1. A process for separating solid particles from a gas stream containing them which comprises mixing the particle laden gas stream, the diameter of said particles being from about 0.1 micon to about 0.5 micron, with steam, vapors of a water miscible, hygroscopic compound having a boiling point at atmospheric pressure of from 100° C. to about 250° C., and vapors of a surface-active agent, said mixing being carried out at a temperature of from about 95° C. to about 110° C. and condensing the resulting mixture to separate said solid particles.

2. A process as in claim 1 wherein the water miscible compound is a liquid polyhydroxylic alcohol.

3. A process as in claim 1 wherein the mixture is condensed through adiabatic expansion by conducting the mixture through a porous barrier having sufficient resistance to flow to effect a condensation-producing pressure drop.

References Cited in the file of this patent

UNITED STATES PATENTS 2,835,530    Schneider _____ May 20, 1958

FOREIGN PATENTS 102,460    Australia _____ Nov. 8, 1937
542,020    Great Britain _____ Dec. 22, 1941